(12) United States Patent
An et al.

(10) Patent No.: US 11,781,728 B2
(45) Date of Patent: Oct. 10, 2023

(54) MOISTURE CONTROL MODULE FOR AUTOMOBILE LAMPS

(71) Applicant: TKENS CO., LTD., Gyeryong-si (KR)

(72) Inventors: Kwang Ho An, Gyeryong-si (KR); Min Jae Soung, Sejong-si (KR); Kyung Sun Jang, Daejeon (KR)

(73) Assignee: TKENS CO., LTD., Gyeryong-si (KR)

( * ) Notice: Subject to any disclaimer, the term of this patent is extended or adjusted under 35 U.S.C. 154(b) by 0 days.

(21) Appl. No.: 17/992,381

(22) Filed: Nov. 22, 2022

(65) Prior Publication Data

US 2023/0175668 A1    Jun. 8, 2023

(30) Foreign Application Priority Data

Dec. 6, 2021 (KR) .......................... 10-2021-0172742

(51) Int. Cl.

| | |
|---|---|
| *F21S 45/30* | (2018.01) |
| *B01J 20/04* | (2006.01) |
| *B01J 20/10* | (2006.01) |
| *B01J 20/12* | (2006.01) |
| *B01J 20/08* | (2006.01) |
| *B01J 20/24* | (2006.01) |
| *B60Q 1/00* | (2006.01) |

(52) U.S. Cl.
CPC ............ *F21S 45/30* (2018.01); *B01J 20/041* (2013.01); *B01J 20/046* (2013.01); *B01J 20/08* (2013.01); *B01J 20/106* (2013.01); *B01J 20/12* (2013.01); *B01J 20/24* (2013.01); *B60Q 1/00* (2013.01)

(58) Field of Classification Search
CPC .................................................. F21S 45/30–49
See application file for complete search history.

(56) References Cited

U.S. PATENT DOCUMENTS

2018/0328580 A1* 11/2018 Tezuka ................. B01D 53/268
2022/0001327 A1*  1/2022 Choi ....................... F21S 45/00

FOREIGN PATENT DOCUMENTS

| CN | 110107864 A | * | 8/2019 |
|---|---|---|---|
| KR | 10-1997-0066253 A | | 10/1997 |
| KR | 20-0340561 Y1 | | 2/2004 |
| KR | 10-2004-0069042 A | | 8/2004 |
| KR | 20-2013-0001991 U | | 3/2013 |
| KR | 10-1825698 B1 | | 2/2018 |
| KR | 10-2019-0091991 A | | 8/2019 |
| KR | 10-2019-0132816 A | | 11/2019 |
| KR | 20-2020-0002853 U | | 12/2020 |
| KR | 10-2245735 B1 | | 4/2021 |

* cited by examiner

*Primary Examiner* — Mariceli Santiago
(74) *Attorney, Agent, or Firm* — Birch, Stewart, Kolasch & Birch, LLP (57) ABSTRACT

Proposed is a moisture control module for an automobile lamp, the moisture control module includes a moisture absorption composition in the accommodating part and seals the moisture absorption composition with a breathable film and a cover, thereby reducing mounting time, space, and cost as compared with a pouch type absorbent. In addition, the moisture absorption performance continues for a long time, and when used in a closed device, which is prone to dew condensation inside according to temperature changes, especially when used in automobile lamps, the internal humidity is kept low, so that dew condensation does not occur inside, and at the same time, has the effect of preventing damage to the packaging material, etc.

14 Claims, 4 Drawing Sheets

B-B' CROSS-SECTIONAL VIEW

B-B' CROSS-SECTIONAL VIEW

MOISTURE CONTROL MODULE FOR AUTOMOBILE LAMPS

The present application claims priority to Korean Patent Application No. 10-2021-00172742, filed Dec. 6, 2021, the entire contents of which is incorporated herein for all purposes by this reference.

BACKGROUND OF THE INVENTION

1. Field of the Invention

The present disclosure relates to a moisture control module for an automobile lamp. More particularly, the present disclosure relates to a moisture absorption structure mounted on a lamp of an automobile to remove the moisture inside the lamp.

2. Description of the Related Art

In general, an automobile has various types of lamps that have a lighting function to help easily identify objects located around the automobile during night driving and a signaling function to inform other automobiles or road users of the automobile's driving condition. For example, it is mainly equipped with headlights for the purpose of lighting functions.

In addition to the general function of illuminating areas around the automobile, these automobile lamps are important parts that can improve the sensibility of consumers in terms of design. While differentiated high-level designs for consumers are required, the appearance of light sources such as LEDs increases the degree of freedom of design, and the structure of lamps is becoming more complicated. Various engineering tasks are emerging to satisfy various performances even in a narrow interior space.

When transporting or storing an automobile, dew condensation occurs due to moisture entering the inside of lamps such as headlamps, rear lamps, fog lamps, and daytime running lights (DRLs). This may cause damage to a mounted electronic device as well as deterioration of light distribution performance. Moreover, in terms of aesthetics, consumer dissatisfaction increases, and industrial losses due to lamp replacement according to claims are large.

In the automobile lamp, the internal temperature of the lamp is changed as the light source provided therein is turned on or off. That is, when the light source is turned on, the temperature inside the lamp rises due to the heat generated by the light source so that the air inside the lamp undergoes thermal expansion. Accordingly, a vent hole is provided at one side of the lamp so that the internal air of the lamp is discharged to the outside when the light source is turned on, and external air is introduced into the lamp when the light source is turned off.

The time when the internal air of the lamp is discharged through the vent hole is when the internal air is thermally expanded as the temperature inside the lamp rises as the light source is turned on, and the time at which outside air is sucked in through the vent hole is when the light source is turned off, and the temperature inside the lamp is lowered to become similar to the outside temperature.

However, in the automobile lamp, external air is introduced into the lamp through the vent hole, and moisture contained in the external air is also introduced into the lamp in a process that the light source is repeatedly turned on and off. When such moisture is not discharged, it changes to concentrated moisture, and dew condensation is generated on the lens surface.

As such, when dew condensation is generated inside the lamp, the light emitted from the lamp may be scattered and reflected, thereby not only reducing the lighting function and/or signal function of the automobile lamp, but also increases the risk of safety accidents such as electronic component leakage.

Conventionally, in order to dehumidify the moisture introduced into the automobile lamp, a pouch-type moisture-absorbing fabric containing a moisture absorbing agent is inserted into a dust cover located at the rear of the lamp or mounted inside the lamp housing.

In this case, during the process of inserting the pouch-type moisture-absorbing fabric into the dust cover or the lamp housing, the moisture absorbing fabric in the shape of a square is crumpled or folded to insert into the limited mounting space. Since the nonwoven type moisture absorbent fabric is crumpled, the durability of the crumpled portion is poor. Accordingly, there is a problem in that the joint portion is broken or the outer skin is damaged due to deterioration of durability due to vibration and environmental changes during automobile operation. In addition, the pouch-type moisture-absorbing fabric has a problem of bursting as the moisture absorbing agent inside swells by absorbed moisture.

Here, when the moisture absorbing agent in the pouch-type moisture-absorbing fabric is mounted in a container such as a bracket, the bracket is fixed while pressing the moisture absorbing agent in the form of a crumpled pouch, which causes a problem in that the moisture absorbed by the moisture absorbing agent is released again due to pressure. In addition, during the process of applying the pouch-type moisture absorbing agent to the dust cover, the moisture absorbing agent may be damaged due to the wrong bolt fastening process, and there is a risk that the contents may be ejected to the outside. In addition, since the process is performed manually, there is a problem in that productivity is lowered.

LITERATURES OF THE RELATED ART

Patent Literature

Korea Patent Application Laid-open Publication No. 10-2019-0091991 (Aug. 7, 2019)

SUMMARY OF THE INVENTION

The present disclosure has been devised to solve the above problems. In detail, an objective of the present disclosure is to provide a moisture control module for an automobile lamp, the moisture control module enabling low internal humidity to be maintained to prevent dew condensation from occurring inside the lamp, the moisture control module having an excellent moisture control function that lasts for a long period of time when the moisture control module is used in a closed device, specifically an automobile lamp, in which dew condensation easily occurs according to a change in temperature.

Another objective of the present disclosure is to provide a moisture control module for an automobile lamp, the moisture control module being free of problems that occurred in existing moisture control modules, the problems including: damage due to the volume expansion of an absorbent, liquid leakage resulting from the damage, and promoting corrosion of parts mounted in the lamp equipped with the module, and deteriorating the durability of the lamp.

The present disclosure relates to a moisture control module for an automobile lamp.

One aspect of the present disclosure includes: an accommodating part having an open upper end and an internal space to accommodate a moisture absorption composition; a cover fastened to an upper portion of the accommodating part, provided with a surface having an open region for ventilation and a closed region for preventing the cover from being damaged due to expansion, and including a breathable film fused to the inside thereof; and a moisture absorption composition accommodated in the accommodating part.

In the present disclosure, the breathable film may be made of a breathable material. Specifically, the breathable film may be of a nonwoven fabric made from any one or multiple synthetic fibers selected from polyethylene, polypropylene, polybutylene, polyethylene terephthalate, polybutylene terephthalate, and polytrimethylene terephthalate.

In addition, the breathable film may be configured that one or more layers made of one or more materials selected from polyolefin, polyester, polyamide, and polyacrylic are laminated on one or both sides of the nonwoven fabric.

In addition, the breathable film may have a moisture permeability in a range of 400 to 6,000 g/m2·24 hr based on KS K 0594 standard.

In the present disclosure, the accommodating part may further include a partition wall therein, and the partition wall may have any one arrangement type selected from a grid type, a radial type, a parallel type, and a fishbone type.

The moisture absorption composition may include a metal chloride, a metal oxide, a metal hydroxide, and a thickening agent. In addition, the moisture absorption composition may further include a filler. The metal chloride may be magnesium chloride, calcium chloride, or a mixture thereof. The metal oxide may be magnesium oxide. The magnesium oxide may use light burn magnesium and two or more components containing light burn magnesium and having different physical properties. In addition, the filler may include pearlite, white clay, and aluminum hydroxide.

The moisture control module for an automobile lamp, according to the present disclosure, can reduce installation time, space, and cost compared to a pouch-type moisture absorbing agent and has the advantage of being able to be applied to an automated manufacturing process.

In addition, the present disclosure has an effect that the moisture absorption performance is maintained for a long period of time, and when used in closed devices in which dew condensation easily occurs due to changes in temperature, especially in automobile lamps, the internal humidity can be maintained low so that dew condensation may not occur in the closed devices. In addition, the present disclosure has the effects of preventing damage to packaging materials thereof attributable to expansion, leakage of the contents thereof, gushing of the contents, and malfunctioning or corrosion of internal parts of the automobile.

DESCRIPTION OF THE PREFERRED EMBODIMENTS

Hereinafter, a moisture control module for an automobile lamp, according to the present disclosure, will be described in more detail by way of Examples and Comparative Examples. However, the embodiments introduced below are provided as examples so that the spirit of the present disclosure can be sufficiently conveyed to those skilled in the art.

Therefore, the present disclosure is not limited to the embodiments presented below and may be embodied in other forms, and the embodiments presented below are only described to clarify the spirit of the present disclosure, and the present disclosure is not limited thereto.

In this case, if there is no other definition of the technical terms and scientific terms used, it has the meaning normally understood by those with ordinary knowledge in the technical field to which the disclosure belongs, and the description of the known function and configuration that may unnecessarily obscure the gist of the disclosure is omitted in the following description.

In addition, singular forms used in the specification and the appended claims may be intended to include plural forms unless otherwise indicated in the context.

In addition, the drawings introduced below are provided as examples so that the spirit of the present disclosure can be sufficiently conveyed to those skilled in the art. Therefore, the present disclosure is not limited to the drawings presented below and may be embodied in other forms, and the drawings presented below may be exaggerated to clarify the spirit of the present disclosure. Also, reference numerals refer to like elements throughout.

In addition, singular forms used in the specification and the appended claims may be intended to include plural forms unless otherwise indicated in the context.

The conventional moisture absorbing agent for automobile lamps is mounted on the lamp housing to remove moisture generated by the temperature difference between the inside and the outside of the lamp and is provided by accommodating the moisture absorption component inside the packaging in the form of a pouch. When mounted on the lamp housing, it is difficult to directly attach and mount the pouch-type moisture absorbing agent to the housing due to vibration or contamination, and thus the pouch-type moisture absorbing agent is crumpled and inserted into the space of the dust cover provided on the rear surface of the housing. After insertion, a bracket is provided on the top of the cover to suppress the flow of the moisture absorbing agent.

At this time, the moisture-absorbing components may expand due to moisture absorption, which may damage the product, and the crumpled pouch-type moisture absorbing agent may damage the bracket of the dust cover, and the damaged bracket may cause physical damage to the adjacent lamp internal mounting parts. In addition, since the moisture-absorbed component has deliquescent properties in which the absorbed components are eluted, damage such as tearing off a part of the packaging material may occur, and the moisture-absorbing component or moisture may leak outside to promote corrosion of electric and electronic components mounted therein. This causes malfunction or failure of the lamp and significantly reduces durability. In addition to the above phenomena, there is a problem in that the humidity control ability is much lower.

Furthermore, the existing pouch-type moisture absorbing agent not only has a different states of packaging materials depending on storage conditions, working environments, workers, etc., but also causes damage to the packaging materials, such as a puncture or torn during the work process.

While repeatedly studying examples to solve the above problems, the present disclosure was completed by discovering that the moisture module can maintain its shape even in the expansion due to moisture absorption, preventing the release of moisture or elution of moisture and making it easy to manufacture and reducing defects, thereby improving productivity and quality. In which a moisture absorbing agent is positioned in a structure provided with an accommodating part having an inner space having an open upper surface and accommodating a moisture absorption composition, and a cover that forms an open area fastened to the upper part of the accommodating part and open for ventilation to the outside and a closed area closed to prevent damage to the cover due to expansion, and including a breathable film fused to the inside.

Figure 1:
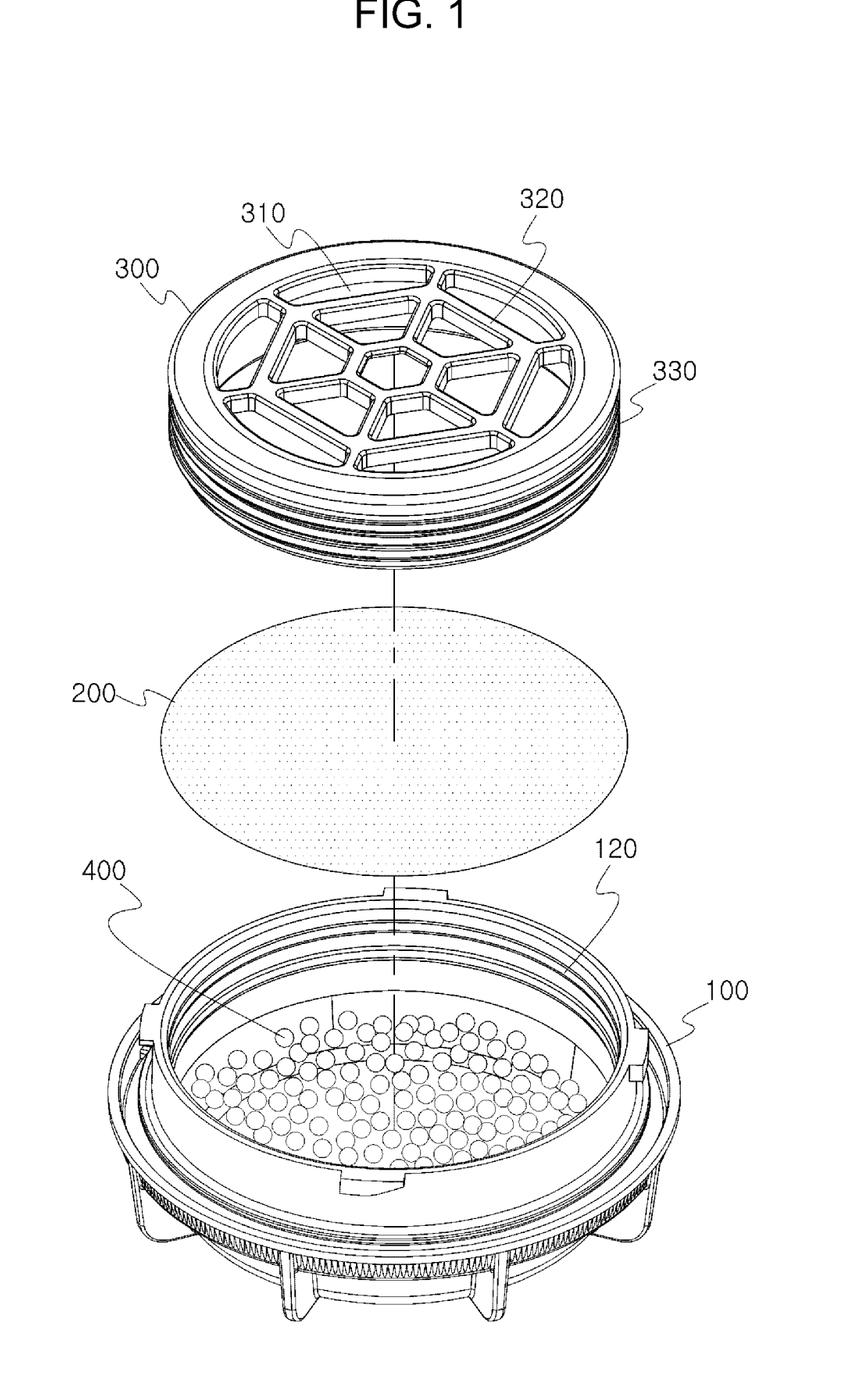
FIGS. 1 and 2 are perspective views of a moisture control module for an automobile lamp according to the present disclosure.

A moisture control module for an automobile lamp, according to the present disclosure, as shown in FIG. 1, includes: an accommodating part 100 having an inner space having an open upper surface and accommodating a moisture absorption composition; a cover 300 which including an open area fastened to the upper part of the accommodating part and open for ventilation to the outside, a closed area being closed to prevent damage to the cover due to expansion, and a breathable film 200 fused to the inside; and a moisture absorption composition 400 accommodated in the form of particles in the accommodating part.

Referring to the drawings in more detail, the accommodating part 100 in the present disclosure provides a space for accommodating the moisture absorption composition, as shown in FIGS. 1 to 3B and has an accommodation space therein and an open-top surface.

The accommodating part does not limit the material. For example, the accommodating part is preferably made of a material that can secure mechanical properties to the extent that the shape does not deform even when the moisture absorption composition is expanded after moisture absorption. Specifically, the accommodating part can be made of polymer resins such as polyethylene, polyester, polyethylene terephthalate, and polypropylene; metals such as aluminum, iron, etc. In addition, the accommodating part may further include a reinforcing material such as talc or glass fiber to be applied to the lamp.

In the present disclosure, the breathable film 200 may be provided to prevent the moisture absorption composition inside the accommodating part from leaking out of the accommodating part due to an impact or the like. In addition, the content that has absorbed the introduced moisture accumulates water on the surface due to excessive moisture absorption, and such water does not leak out and may not easily rupture or burst even if punctured by a sharp object.

In particular, since the moisture absorbing agent generally expands and hardens after moisture absorption and often exhibits deliquescent properties due to moisture absorption, the dust cover of the lamp having a limited space may be damaged or deformed by physical expansion. In addition, there is a possibility that the contents may be leaked to the outside due to damage to the packaging material by the moisture absorbing agent product during expansion. In this case, it is important to provide a breathable film because dew condensation inside the lamp or even internal corrosion caused by leakage of contents can result in replacement costs for the automobile lamp module and deterioration of functional and consumer quality aside from the fact that the life of the moisture absorbing agent is greatly reduced.

More specifically, the breathable film is made of a single sheet or a laminated multi-layered sheet, in which the sheet is a porous film or nonwoven fabric, and may include a film or nonwoven fabric using a polymer as raw material, and specifically, may have a structure in which at least one polymer film layer is laminated on the breathable nonwoven fabric.

In the present disclosure, the breathable nonwoven fabric layer may have a structure in which a multi-layered nonwoven fabric and a film are sequentially laminated so as to have air permeability as a base layer of a breathable film and to ensure tensile strength, bursting strength, and the like.

The material of the nonwoven fabric layer is preferably a polymer fiber having excellent mechanical properties such as polyethylene or polyethylene terephthalate, and the film includes a material having mechanical properties and chemical stability, such as polyethylene or polypropylene.

In particular, the polypropylene staple fibers have advantages, such as low specific gravity, excellent chemical resistance, and low price compared to other natural or synthetic fibers and can be manufactured into various types of nonwoven fabrics. In addition, when using a thermal bonding method of bonding a fiber web by using heat or making felt through needle punching with staple fibers, a low melting point (about 165° C.) unique to polypropylene can be secured simultaneously with air permeability and mechanical properties.

In addition, the breathable film may further form a coating layer including one or more polymer components on the surface of the prepared film layer to control the air permeability.

The coating layer is not limited to a type as long as it is commonly used in the art and may include a synthetic latex, more preferably an acrylic latex adhesive and/or an acrylic latex resin.

More specifically, it is preferable to include ethylene vinyl acetate (EVA) as the acrylic latex. The EVA material for forming the coating layer preferably corresponds to a hot melt adhesive including EVA, and by controlling the coating degree of the component, the moisture permeability of the breathable film and, thus the lifespan of the product can be controlled.

Other materials among a component of the coating solution for forming the coating layer are a curing agent, an inorganic filler, and/or an additive resin, and the curing agent may be at least one selected from the group consisting of an amine-based curing agent, an acid anhydride-based curing agent, a phenol-based curing agent, and a dicyandiamide-based curing agent. The inorganic filler may be, for example, at least one selected from the group consisting of calcium carbonate, magnesium carbonate, talc, mica, kaolin, graphite, and silica, and the additive resin, for example, may be at least one selected from the group consisting of terpene phenolic resin, hydrogenated rosin, petroleum resin, xylene resin, and coumarone resin. Solvent among a component of the coating solution for forming the coating layer may be, for example, at least one selected from the group consisting of toluene, acetone, and methyl ethyl ketone.

The thickness of the coating layer is not limited in the present disclosure but preferably in a range of 1 to 50 μm, more preferably 5 to 10 μm.

In the present disclosure, the breathable film is not limited to basis weight or moisture permeability but may have a basis weight in a range of 50 to 150 $g/m^2$, preferably 60 to 140 g/m², and more preferably 70 to 130 g/m². In addition, the moisture permeability may be in a range of 400 to 6,000 g/m²·24 hr, preferably 500 to 5,000 g/m²·24 hr, more preferably 600 to 4,000 g/m²·24 hr according to KS K 0594 standard. When the above range is satisfied, the moisture does not leak out on the surface of the nonwoven fabric layer even if the moisture absorbent inside the moisture absorbing agent absorbs 200% or more of its own weight while having excellent air permeability and excellent tensile strength can be secured.

The breathable film may prevent leakage of moisture absorbed and at the same time, may be made of a chemically stable material that does not damage the material by the expansion of the moisture-absorbed composition.

Specifically, the breathable film may have a structure in which two or more layers of films are laminated and may include a polymer material such as polypropylene, high-density polyethylene, low-density polyethylene, and polyethylene terephthalate. Preferably, the breathable film may be at least one selected from polyethylene terephthalate and polyethylene.

As described above, the breathable film is preferably bonded to the inside of the cover so that the moisture absorption composition in the accommodating part does not flow out to the outside of the accommodating part, thereby providing sealing properties to the module. In this case, the method of imparting the sealing property includes a method of using heat sealing, high frequency, ultrasonic wave, or an adhesive, and in addition, if the breathable film can be completely sealed, there is no particular limitation.

More preferably, the breathable film and the cover are bonded by thermal fusion. As described above, the breathable film has polypropylene as its main component, and since the polypropylene is a thermoplastic resin, it can be integrally bonded and sealed with the cover by thermal bonding, since bonded product is naturally cured when heat is removed even after adhesion, the bonded product has an advantage of expressing adhesive strength of a predetermined level or more without applying special processing.

The cover 300 is to protect the moisture absorption composition or the breathable film of the accommodating part from external impact and to prevent deformation of the accommodating part due to expansion of the moisture absorbing composition and may be fastened to an open side of the accommodating part.

Figure 2:
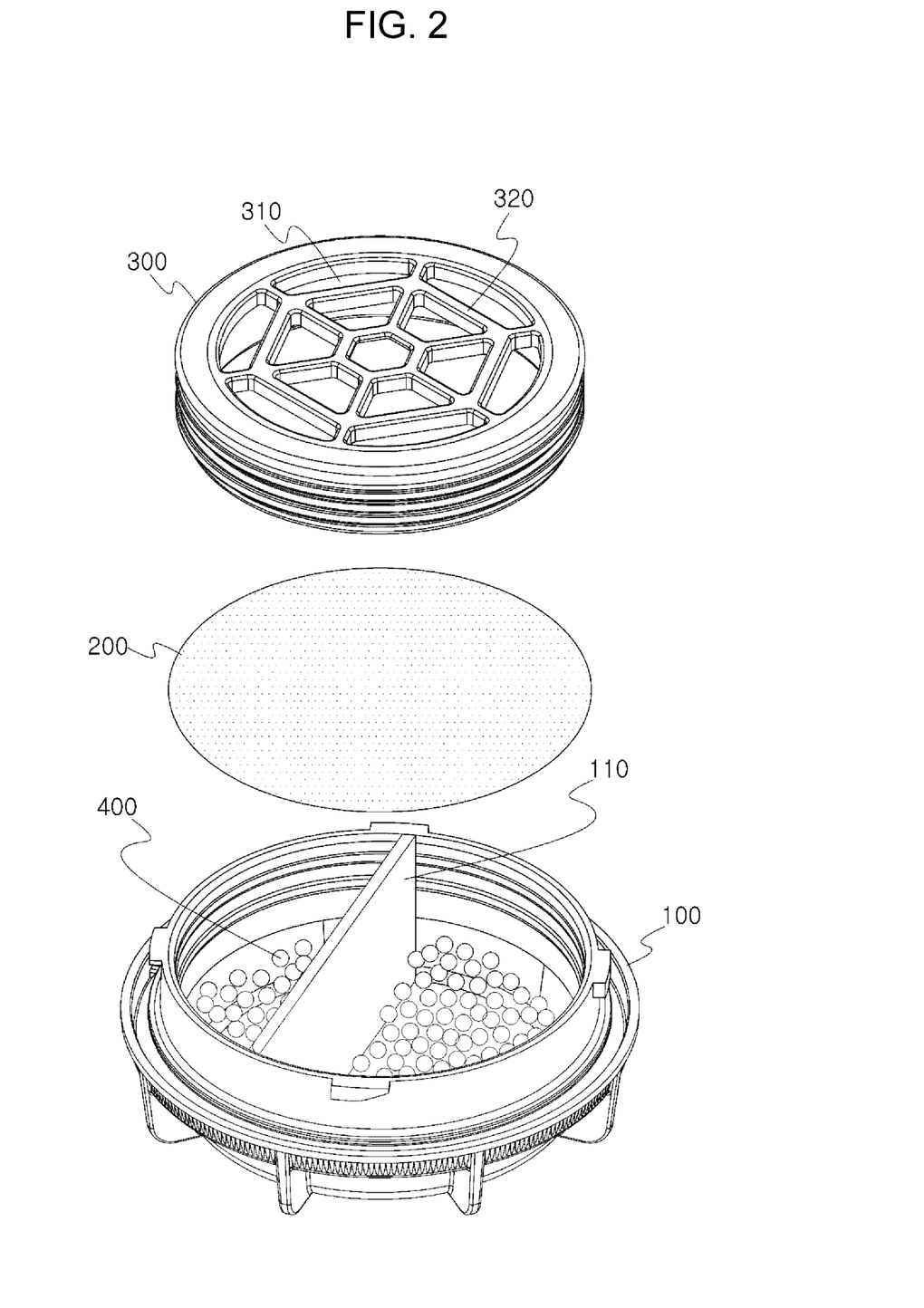

The cover blocks the open portion of the accommodating part as shown in FIGS. 1 and 2 and at the same time, an open area 310 that is opened to allow ventilation with the outside on one side so that moisture can enter and exit the accommodating part, and a closed area 320 that is closed to prevent cover damage by expansion may be formed to the cover.

The cover does not limit the fastening method with the accommodating part. For example, as shown in FIGS. 1 and 2, at least one concave-convex or screw line formed on the surface in contact with the cover and the accommodating part to be coupled by fitting or rotation, and a coupling hole may be formed to face each other, and a coupling pin may be inserted into the coupling hole to be coupled.

Alternatively, one or more O-rings may be provided on the outer circumferential surface of the cover or the inner circumferential surface of the accommodating part, or both instead of concave-convex or screw line. When the O-ring is formed as described above, a receiving groove capable of accommodating the O-ring may be formed inwardly on an outer circumferential surface or an inner circumferential surface of the receiving part or cover in which the O-ring is formed so that the O-ring is not deviated from its original position by insertion of the cover.

In addition, the cover may include a protuberance part 330 formed to protrude from the outer surface inserted into the accommodating part. The protuberance part may have an elastic force, and a pair of protrusion parts 120 may be provided on the inner circumferential surface to fix the protuberance part to the inner surface of the accommodating part. After the cover is inserted, the protuberance parts may be fixed to each other because the protuberance parts are positioned and fixed between the protrusion parts of the accommodating part.

In another aspect, one side of the cover and the accommodating part abutting on one side may be welded to bind the cover and the accommodating part. The welding method may use friction heat but is not limited thereto. For example, the protuberance part may be welded to and bound to the inner protuberance part of the accommodating part.

Figure 3A:
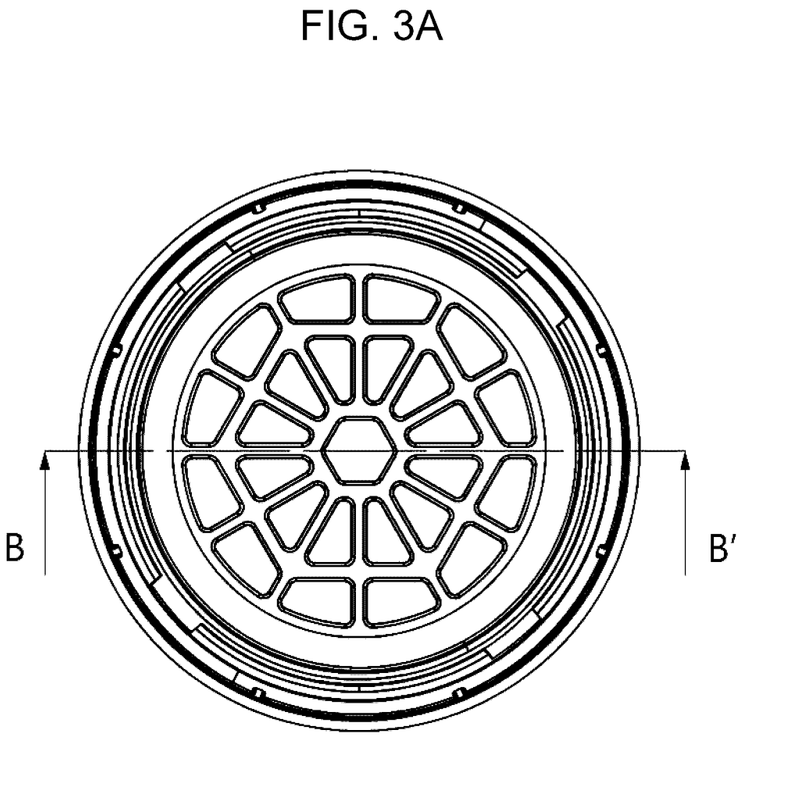
FIG. 3A is a top view of an accommodating part according to the present disclosure.
Figure 3B:
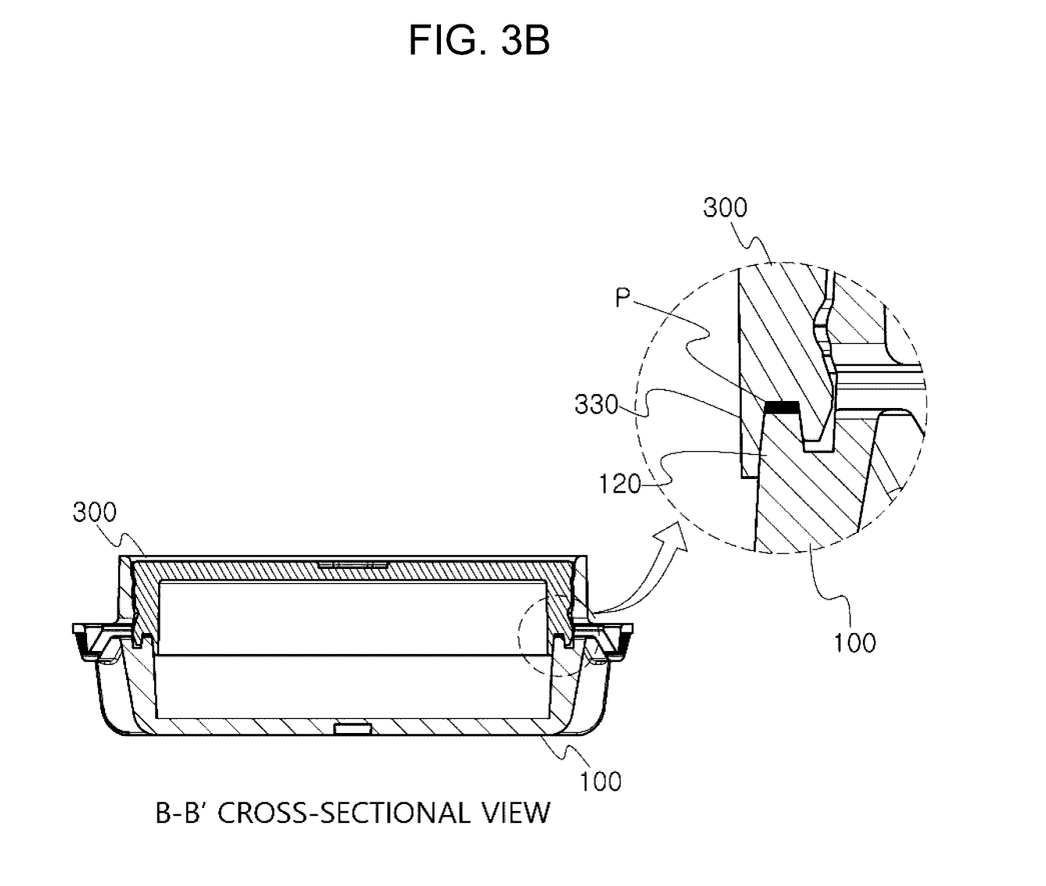
FIG. 3B is a cross-sectional view of an accommodating part according to the present disclosure.

For example, as shown in FIGS. 3A and 3B, the cover may have a protuberance part 330 protruding along the end of the outer surface into which the accommodating part is inserted. In particular, the protuberance part may protrude from an end part of the cover, which is bent and extended in a direction in which the cover is inserted.

Separately, the accommodating part is provided with a protrusion part 120 protruding in the direction of the center of the accommodating part along the inner circumferential surface, and the protrusion part is formed to have an outer circumferential surface that can be in direct contact with the surface of the protuberance part formed in the direction in which the cover is inserted.

As described above, the outer circumferential surface of the protuberance part and the outer circumferential surface of the protrusion part may be coupled by melting the outer circumferential surface of the protuberance part and the outer circumferential surface of the protrusion part by welding, which will be described later. For example, the cover is inserted into the accommodating part so that the outer circumferential surface of the protuberance part and the outer circumferential surface of the protrusion part are in direct contact with each other. In that state, when the cover or the accommodating part is pressed and rotated, the outer circumferential surface of the protuberance part and the outer circumferential surface of the protrusion part are partially melted by frictional heat. When rotation is stopped in this state, the molten component becomes natural to form a cured-welded welding part P, and thus the cover or the accommodating part can be maintained without being separated even when the internal moisture absorbing agent is expanded.

In addition, the material of the cover is not limited. Specifically, the cover may be formed of the same or different material as the accommodating part, for example, may be formed of any one or more of the above-described polymer resin or metal. However, it is preferable in terms of compatibility that the cover has the same material as the breathable film in consideration of bonding through a process such as thermal fusion with the breathable film seated on the inside.

In addition, as shown in FIG. 2, the accommodating part may further include a partition wall 110 therein. One or a plurality of the partition walls may be disposed to be spaced apart from each other in the inner accommodating space of the accommodating part.

In general, the moisture control module for an automobile lamp, according to the present disclosure, is mounted in a vertically erected state when mounted on a closed device, particularly a lamp of an automobile. At this time, a phenomenon occurs in which the moisture absorption composition inside is naturally drawn to the lower side by gravity in a state in which the structure is erected, thereby reducing the area in which the moisture absorption composition is in contact with the outside air.

In order to prevent this phenomenon, the moisture absorption structure may be provided with one or more partition walls inside the accommodating part to divide the accommodating space of the accommodating part. In this case, since a large number of accommodating spaces are created by the partition wall, the moisture absorption composition can be accommodated in each divided space, and the contact area between the moisture absorption composition and the outside air can also be increased by alleviating the phenomenon of drawing to the lower side of the moisture absorbent.

The partition wall is not limited in shape. For example, the partition wall may have any one arrangement shape selected from a grid type, a radial type, a parallel type, and a fishbone type.

For example, the partition wall may be a cross-shaped or radial partition wall, and the space of the accommodating part may be divided into equal volume sizes. Therefore, the moisture absorption composition to be described later can be easily accommodated not only in powder or granular form but also in bulky moisture absorption composition such as pouch form.

In this case, the parallel partition wall may be formed when a plurality of spaces of the accommodating part needs to be provided compared to other types of partition walls. In this case, the moisture absorption composition is provided in fine particles such as powder or granular form, and it can be used to increase hygroscopicity by allowing the moisture absorption composition to have a larger exposed area.

The partition wall is not limited in material or size. In the case of the material, a partition wall may be formed of one or more metals or polymer resins in the same way as the accommodating part or the cover, and in the case of the size, a partition wall is preferable to completely divide the accommodating space by contacting the inner surface and the inner surface of the accommodating part. In addition, as described above, the upper surface of the partition wall is preferably bonded to be sealed with breathable film.

Here, the partition wall may be further formed with pores penetrating in a direction toward the accommodating space in order to further increase air permeability. The pores are not limited in shape, size, or number, and for example, the diameter of the pores is preferably formed to be smaller than the diameter of the moisture absorption composition to prevent the moisture absorption composition from being concentrated in a single accommodating space, and the number may be one or more, but is not limited thereto.

In the present disclosure, the moisture absorption composition 400 is provided in the inner space of the accommodating part by mixing a plurality of components having hygroscopicity as shown in FIG. 1 and the like, and also may be provided in the form of a pouch accommodating them in a breathable film.

In detail, the moisture absorption composition includes any one or a plurality selected from a metal chloride, a metal oxide, a metal hydroxide, a thickening agent, and a filler.

In the present disclosure, the metal chloride absorbs moisture in the atmosphere based on high deliquescent properties and may improve rust prevention in some cases, and mainly includes chlorides of alkali metals or alkaline earth metals.

Examples of the metal chloride may include magnesium chloride, sodium chloride, calcium chloride, lithium chloride, strontium chloride, yttrium chloride, and copper chloride, and these may be used alone or in a combination of two or more.

More preferably, magnesium chloride may be included as the metal chloride in the present disclosure. Magnesium chloride ($MgCl_2$) has the best hygroscopicity due to a high hygroscopicity of up to 1.5 times or more compared to other metal chloride and has 2, 4, 6, 8, 10, 12 hydrates in addition to anhydride.

Magnesium chloride is relatively easy to obtain as a main component of bittern, which is a by-product after salt is collected from seawater, and has excellent deliquescent properties, so it is most preferable for the moisture absorption composition according to the present disclosure.

In addition, more preferably, calcium chloride may be included as the metal chloride. Calcium chloride ($CaCl_2$) is generally present in the form of anhydride or dihydrate and has a property of generating heat of reaction when calcium chloride meets water. In addition, since calcium chloride has excellent deliquescent properties compared to other metal chlorides, it is preferable as a moisture absorption composition according to the present disclosure.

In the present disclosure, the metal chloride is not limited to a manufacturing method. However, the metal chloride must be used in a dried state to have deliquescent properties, and for this, the drying process must be necessarily included in the manufacturing process. In this case, the detailed conditions of the drying process are not limited in the present disclosure, and it is preferable to dry in an oven set at a temperature of 150° C. or higher or to use vacuum drying, freeze-drying, or the like.

In the present disclosure, the metal chloride is not limited to the manufacturing process. For example, aluminum chloride can be obtained by leaching magnesia stone into hydrochloric acid several times and then filtering various impurities, as described in "Preparation of magnesia (99% MgO) by Ruthner-HCl-preparation" (Andritz-Ruthner Industrianlagen Aktiengesellschaft, Aichholzgasse 51-53, A-1120 Vienna, pages 5-7) of Hans Jedlicka and the like.

In addition, the metal chloride may be further mixed with a silicon compound. The silicon compound can immobilize corrosion products such as metal ions, chlorine ions, and the like, which are generated during a moisture absorption process of the metal chloride, thereby significantly increasing the corrosion prevention effect.

In the present disclosure, the type of the silicon compound is not limited, but zeolite is preferably used. Zeolite is a crystalline aluminum silicate mineral and has the property of strongly adsorbing polar substances according to the action of cations in the crystal structure, so zeolite adsorbs not only corrosion products but also moisture. Due to micropores of a certain size of the zeolite, molecules smaller than the micropores may be selectively passed and adsorbed.

In the present disclosure, first, a solution can be prepared by dissolving a metal chloride in water, mixing porous zeolite as the silicon compound, spraying the mixture to form a droplet with a predetermined average particle diameter, and then drying the mixture droplet to prepare a mixed moisture absorption component of the metal chloride-silicon compound.

In the present disclosure, the silicon compound is preferably added in an amount of 100 to 500 parts by weight based on 100 parts by weight of the metal chloride. In the above range, it is possible to express a stable moisture absorption ability, and the corrosion prevention performance can be greatly improved.

In addition, the metal chloride is preferably included in an amount of 10% to 65% by weight based on 100% by weight of the total composition. When the metal chloride is added below the above range, moisture absorption performance may be greatly reduced, and when the metal chloride is added above the above range, a liquefied corrosion product may be released due to an excessive increase in deliquescent properties.

In the present disclosure, the metal oxide prevents the initial liquefaction of the metal chloride that may occur due to the hydration reaction and has the effect of securing gel stability.

Examples of metal oxide include any one or a plurality selected from calcium oxide, barium oxide, magnesium oxide, strontium oxide, sodium oxide, and potassium oxide, and these may be used alone or in a combination of two or more.

More preferably, magnesium oxide may be included as the metal oxide. The magnesium oxide forms a needle-shaped hydration product to absorb the initially liquefied metal chloride to maintain a solid shape. In addition, the magnesium oxide reacts with the metal chloride, more specifically, magnesium chloride to proceed with a solidification reaction.

To explain this in more detail, metal chlorides, particularly magnesium chloride, have a hygroscopicity property even in a small amount of moisture due to their high deliquescent properties and thus can impart a high hygroscopicity function. However, magnesium chloride absorbs moisture and liquefies at the same time due to the deliquescent phenomenon, and the aqueous solution generated through the liquefaction phenomenon acts as a corrosion product, thereby greatly reducing corrosion prevention properties. However, when magnesium oxide is mixed, the aqueous solution of magnesium chloride forms magnesia cement with magnesium oxide and a hydration reaction proceeds to become a solid, thereby suppressing the deliquescent properties of the initial metal chloride, thereby preventing liquefaction. In order to form the magnesia cement, the composition further absorbs water, and after that, the deliquescent phenomenon of the metal chloride is stopped. Therefore, unlike the existing metal chloride or silica gel, the side effect of re-releasing the absorbed moisture can be suppressed due to this mechanism, the corrosion prevention property is also improved and cracking or re-pulverization can be prevented by improving the strength of the cured composition.

In the present disclosure, the magnesium oxide is more preferably light-burned magnesium oxide, dead-burned magnesium oxide, or a mixture thereof.

In the present disclosure, light-burned magnesium oxide is a chemically reactive magnesium oxide calcined at a temperature of about 1,000° C., and dead-burned magnesium oxide is a magnesium oxide that is formed with extremely low reactivity by calcinating magnesite at a calcinating temperature of 1,450° C. or higher and is also called dead-burned magnesium oxide.

To explain this in more detail, in general, calcined magnesium oxide can be produced by crushing magnesite and removing impurities, and then calcining the same. At this time, during the calcinating process, magnesium carbonate ($MgCO_3$) in the magnetite is converted into magnesium oxide (MgO), and carbon dioxide ($CO_2$) escapes from the inside of the magnetite, creating numerous pores.

That is, the specific surface area of magnesium oxide increases with the calcinating temperature or time, and the reactivity with magnesium chloride is relatively decreased. Therefore, when magnesium oxide having a different degree of calcination is mixed or selectively used, the strength of the cured composition can be improved, and hygroscopicity can be further increased.

In the present disclosure, the magnesium oxide preferably includes light-burned magnesium oxide, dead-burned magnesium oxide, or a mixture thereof, and more preferably includes light-burned magnesium oxide or a mixture of light-burned magnesium oxide and dead-burned magnesium oxide. When the dead-burned magnesium oxide is used alone, it may be difficult to control the deliquescent properties of the composition because the reactivity with magnesium chloride is lower than that of the light-burned magnesium oxide.

When a mixture of light-burned magnesium oxide and dead-burned magnesium oxide is used as the magnesium oxide, it is preferably mixed in a weight ratio of 1 to 6:4 to 9, respectively. When the composition ratio is out of the above range, it may be difficult to control the deliquescent properties of the composition, or the increase in hygroscopicity may be reduced.

In addition, the metal oxide is preferably included in an amount of 10% to 55% by weight based on 100% by weight of the total composition. When the metal oxide is added below the above range, it is difficult to control the high deliquescent properties of the metal chloride, so the corrosion prevention effect may be greatly reduced, and when the metal oxide is added beyond the above range, the hygroscopicity can be degraded due to the caking effect due to the rapid magnesium reaction.

In the present disclosure, the filler itself has porosity to increase the absorption rate of moisture and at the same time, serves as a binder between each component of the composition to have the effect of inhibiting the elution of moisture.

In the present disclosure, the filler includes, for example, perlite, kaolin (white clay), anhydrite, hemihydrate gypsum, aluminum hydroxide, titanium dioxide, and bentonite. It may include a porous powder such as diatomite, white clay, red clay, clay, allophane, oyster shell, silicon dioxide, vermiculite, sepiolite, zeolite, pozzolan, and microcement.

In the present disclosure, the filler may be more preferably a mixture of pearlite, kaolin (white clay), and aluminum hydroxide. The kaolin is named after the first white clay found in Gaoling in Jingdezhen, Jiangxi Province, a famous clay production area in China, and the chemical component includes lead stone in $Al_2Si_2O_5(OH)_4$. Kaolin is slippery and withstand high temperatures well, and the more this ingredient is, the more the kaolin becomes a material for pottery. Kaolin is a natural mineral that is composed of fine porous particles and has an excellent humidity control function. In particular, the kaolin is a material that can increase hygroscopicity while reducing the deliquescent properties of magnesium chloride due to excellent reactivity with magnesium chloride.

The perlite is artificial soil prepared by heating and expanding pearlstone generated by volcanic action to 850° C. to 1,200° C., and the moisture inside is removed, and the volume expands at the same time to form fine pores. Therefore, when mixed with the metal chloride, metal oxide, or metal hydroxide, the hygroscopicity of the composition can be further increased, and at the same time, even when the life of the product is over due to excessive moisture absorption, the pearlite releases the absorbed moisture back into the air, thereby significantly increasing the life or recycling of the product.

The aluminum hydroxide ($Al_2O_3$), like white clay, is composed of fine porous particles and has excellent hygroscopicity. In particular, aluminum hydroxide has excellent reactivity with calcium chloride, thereby reducing the deliquescent properties of calcium chloride and increasing hygroscopicity.

It is preferable that the white clay and the aluminum hydroxide are included in an amount of 0.1% to 10% by weight, respectively, based on 100% by weight of the total composition. When the amount of each material added is less than 0.1% by weight, the aqueous solution of the composition may leak as deliquescence is expressed, and the hygroscopicity may decrease relatively. In addition, when the added amount exceeds the above range, miscibility with other compositions may decrease, and moldability or hygroscopicity may decrease.

In the present disclosure, the filler preferably contains 0.1% to 20% by weight based on 100% by weight of the total composition. When the filler is contained in an amount less than the above range, hygroscopicity may be reduced, and when the filler is contained in an amount that exceeds the above range, deliquescent corrosion products may flow out.

In the present disclosure, the thickening agent maintains a gel state even after moisture absorption, and particularly, fixes the composition in a state in which metal chloride or metal chloride particles are in contact with each other even after moisture is removed.

The thickening agent may include, for example, starch, carboxymethyl cellulose, methyl cellulose, hydroxyethyl cellulose, casein, sodium caseinate, ammonium caseinate, polyvinyl alcohol, polyvinyl pyrrolidone, guar gum, xanthan gum, gum arabic, ghatti gum, locust bean gum, dammar gum, gellan gum, rosin gum, karaya gum, copal gum, tara gum, tamarind gum, tragacanth gum, unmodified starch, modified starch, poly N-vinylacetamide, polyacrylamide, N-vinylacetamide-sodium acrylate copolymer, polyacrylamide-sodium acrylate copolymer, polytetrafluoroethylene, etc., in addition to these, the thickening agent may include a polymer selected from tetrafluoroethylene-polyfluoropropylene copolymer, tetrafluoroethylene-polyfluoroalkylvinyl ether copolymer, polyvinyl fluoride, polyvinylidene fluoride, styrene-butadiene copolymer, polyvinylpyridine, and vinylpyridine-methyl methacrylate copolymer. These may be used alone or in a combination of two or more.

It is desirable that the thickening agent takes the particle size within a specific range. This is because, when the thickening agent is dissolved according to the moisture absorption of the composition, the dissolution time is delayed due to the occurrence of agglomeration between the particles, and as the solubility deteriorates, the gel formation is adversely affected. In particular, the thickening agent acts as a factor to increase thixotropy and pseudoplasticity in the presence of moisture when mixed with inorganic materials, and when there is no external force, viscosity increases to hold moisture. Such thixotropy and pseudoplasticity may be determined by the specific surface area of the thickening agent.

Specifically, the thickening agent preferably has a particle size of 150 μm or less, more preferably in a range of 100 to 150 μm. When the particle size of the thickening agent exceeds 150 μm, the gel stability after moisture absorption may be greatly reduced due to a decrease in specific surface area and may adversely affect long-term moisture absorption.

The thickening agent is preferably included in an amount of 10% to 40% by weight based on 100% by weight of the total composition. When the thickening agent is added below the above range, corrosion products damaged by insufficient gel formation may be discharged even after moisture absorption, and when the thickness is added more than the above range, moisture absorption may be reduced due to a decrease in the amount of the main moisture absorption component.

In addition, the composition may further include an additive for imparting effects such as preventing the weakening of hygroscopicity due to hygroscopicity and caking and reducing the heat of hydration. Examples of such additives include thickening aid agents, thermal hydration inhibitors, anti-caking agents, catalysts, surface-active additives, emulsifiers, reaction retardants, pigments, dyes, flame retardants, anti-aging agents, phase transition substances, scorch inhibitors, plasticizers, and antibacterial agents. Such additives are not limited in the amount and type of addition within the range that does not impair the purpose of the present disclosure.

In the present disclosure, the moisture absorption composition may have a different composition depending on the type of metal chloride. For example, when magnesium chloride is used as a metal chloride, it is preferable to mix white clay, carboxymethyl cellulose, etc., together with magnesium oxide with excellent reactivity with magnesium chloride, and when calcium chloride is used as a metal chloride, it is preferable to mix starch, etc., with aluminum hydroxide.

In the present disclosure, the moisture-absorbing composition may be molded in various forms, such as a powder type, a pill type, a disk type, a granule type, etc., and the preparation method thereof is not limited. For example, the moisture absorption composition may be formed into the desired shape by stirring and drying components such as metal chloride, metal oxide, thickening agent, and filler to obtain a mixture and then extruding the same.

Hereinafter, the present disclosure will be described in more detail with reference to Examples and Comparative Examples. However, the following Examples and Comparative Examples are only examples for explaining the present disclosure in more detail, and the present disclosure is not limited to the following Examples and Comparative Examples.

Examples 1 to 10 and Comparative Examples 1 and 2

A moisture absorbing agent was prepared by uniformly mixing in the composition ratio shown in Table 1. At this time, each component includes magnesium chloride (purity 94%, Aldrich), calcium chloride (STARMAG 50), magnesium oxide-1 (light-burned, bulk density 0.55 g/mL, average particle diameter 75 μm, purity 98%), magnesium oxide-2 (dead-burned, bulk density 0.77 g/mL, average particle diameter 220 μm, purity 99%), thickening agent (carboxymethylcellulose, CAS 9004-32-4, Shinwon Corporation), polyethylene wax (Lion Chemtech), starch (corn starch, Q one Co.), and aluminum hydroxide (Aldrich Co.).

In order to manufacture the integrated moisture absorbing agent, as shown in FIG. 2, 35 g of the content of the composition according to Example 1 was introduced into the accommodating part, and then a cover having a breathable film fused therein was fastened to the accommodating part to seal the accommodating part. At this time, the accommodating part with a height of 29 mm and a diameter of 78 mm was used, and the breathable film having a triple structure, including one or more PET nonwoven layers, a thickness of 150 μm, an average weight of 78 $g/m^2$ and moisture permeability of 4,000 $g/m^2$ and 24 hr was used.

TABLE 1

| Division | Composition (%) | | | | | | | |
|---|---|---|---|---|---|---|---|---|
| | Magnesium chloride | Calcium chloride | Magnesium oxide | Carboxy Methylcellulose | PB vax | Perlite | White clay | Aluminum hydroxide |
| Example 1 | 35 | — | 25 | 25 | — | 5 | 10 | — |
| Example 2 | 35 | — | 45 | 10 | — | 5 | 5 | — |
| Example 3 | 30 | — | 55 | 15 | — | — | — | — |
| Example 4 | 35 | — | 45 | 20 | — | — | — | — |
| Example 5 | 40 | — | 40 | 10 | — | — | 5 | 5 |
| Example 6 | 35 | — | 35 | 15 | — | 5 | 5 | 5 |
| Example 7 | — | 65 | — | 20 | — | — | 5 | 10 |
| Example 8 | — | 55 | 15 | 15 | — | 5 | 5 | 5 |
| Example 9 | 45 | 15 | 20 | 10 | — | 2 | 3 | 5 |
| Example 10 | 15 | — | 60 | 15 | — | — | 10 | — |
| Comparative Example 1 | 40 | — | 30 | — | 15 | 5 | 5 | 5 |
| Comparative Example 2 | 45 | — | 35 | — | 10 | 5 | 5 | — |

The physical properties of the specimens prepared in the following Examples and Comparative Examples were measured as follows.

(Moisture Absorption Rate)

The modules manufactured in Examples and Comparative Examples were put into a thermo-hygrostat at 234 and relative humidity of 50% and a thermo-hygrostat at 50° C. and relative humidity of 95%, respectively, and exposed to moisture conditions for 3 weeks. After 1 day, 3 days, 7 days, 14 days, and 21 days after exposure, the weight of the sample was measured, and the ratio with the initial sample was calculated by substituting the values in Formula 1 below.

Moisture absorption rate (%)={(final weight after moisture absorption−initial weight)/initial weight}×100  [Formula 1]

TABLE 2

| | Moisture absorption rate (40° C., 50% R.H, %) | | | | |
|---|---|---|---|---|---|
| | 1 day | 3 days | 7 days | 14 days | 21 days |
| Example 1 | 6.81 | 14.29 | 29.91 | 45.49 | 68.24 |
| Example 2 | 6.98 | 15.18 | 32.94 | 48.88 | 69.79 |
| Example 3 | 6.61 | 12.98 | 25.59 | 40.27 | 61.63 |
| Example 4 | 7.11 | 16.42 | 32.58 | 47.64 | 66.18 |
| Example 5 | 6.82 | 14.84 | 30.05 | 46.31 | 69.12 |
| Example 6 | 7.38 | 17.64 | 34.56 | 53.11 | 72.51 |
| Example 7 | 6.64 | 15.88 | 30.14 | 42.12 | 62.71 |
| Example 8 | 6.54 | 16.13 | 32.36 | 44.10 | 64.28 |
| Example 9 | 7.44 | 17.85 | 34.78 | 54.01 | 71.89 |
| Example 10 | 5.25 | 15.15 | 30.10 | 44.15 | 66.32 |
| Comparative Example 1 | 4.13 | 12.37 | 25.46 | 38.92 | 53.68 |
| Comparative Example 2 | 4.28 | 13.64 | 28.91 | 40.33 | 55.40 |

TABLE 3

| | Moisture absorption rate (40° C., 50% R.H, %) | | | | |
|---|---|---|---|---|---|
| | 1 day | 3 days | 7 days | 14 days | 21 days |
| Example 1 | 25.31 | 38.43 | 55.24 | 82.36 | 122.36 |
| Example 2 | 25.34 | 37.72 | 55.32 | 83.88 | 123.88 |
| Example 3 | 22.45 | 30.15 | 52.47 | 78.52 | 118.52 |
| Example 4 | 25.17 | 38.77 | 55.10 | 82.96 | 123.16 |
| Example 5 | 22.53 | 30.15 | 52.17 | 78.20 | 114.23 |
| Example 6 | 27.27 | 42.65 | 69.10 | 101.37 | 139.17 |
| Example 7 | 24.46 | 38.57 | 55.01 | 82.78 | 120.78 |
| Example 8 | 24.53 | 38.23 | 55.01 | 82.67 | 119.67 |
| Example 9 | 25.41 | 39.67 | 58.91 | 89.85 | 128.85 |
| Example 10 | 25.13 | 40.23 | 59.24 | 90.01 | 129.15 |
| Comparative Example 1 | 23.98 | 35.26 | 51.12 | 79.88 | 103.52 |
| Comparative Example 2 | 24.57 | 37.63 | 52.47 | 81.23 | 105.81 |

(Release Rate)

The moisture control module specimens for automobile lamps prepared in Examples and Comparative Examples were absorbed moisture of 100% in a thermo-hygrostat of 40° C. and 90% relative humidity and then left in a thermo-hygrostat of 80° C. and 30% relative humidity for 24 hours to measure the weight and confirm the release rate by substituting the value in Formula 2 below.

Release rate={(initial weight−dry weight)/initial weight}×100  [Formula 2]

TABLE 4

| | Initial weight (g) | Dry weight (g) | Initial weight − dry weight (g) | Release rate |
|---|---|---|---|---|
| Example 1 | 121.07 | 118.15 | 2.92 | 2.41 |
| Example 2 | 121.48 | 117.88 | 3.60 | 2.96 |
| Example 3 | 121.50 | 117.81 | 3.69 | 3.04 |
| Example 4 | 122.16 | 118.54 | 3.62 | 2.96 |
| Example 5 | 121.84 | 119.35 | 2.49 | 2.04 |
| Example 6 | 121.60 | 117.15 | 445 | 3.66 |
| Example 7 | 121.54 | 115.59 | 5.95 | 4.90 |
| Example 8 | 121.68 | 115.81 | 5.87 | 4.82 |
| Example 9 | 122.04 | 119.04 | 3.00 | 2.46 |
| Example 10 | 121.63 | 118.22 | 3.41 | 2.80 |
| Comparative Example 1 | 120.14 | 105.14 | 15.00 | 12.50 |
| Comparative Example 2 | 121.07 | 106.54 | 14.53 | 12.00 |

(Expandability)

Moisture control module specimens for automobile lamps prepared in Examples and Comparative Examples were left in a thermo-hygrostat at 35° C. and 90% relative humidity for 20 days to confirm the amount of moisture absorption and expandability. The expansibility was measured by measuring the extent to which the specimen deviates from the position of the cover mounted on the accommodating part.

TABLE 5

|  | Expansion height (mm) |
|---|---|
| Example 1 | 2.0 |
| Example 2 | 1.9 |
| Example 3 | 2.1 |
| Example 4 | 1.3 |
| Example 5 | 0.7 |
| Example 6 | 2.2 |
| Example 7 | 3.3 |
| Example 8 | 3.6 |
| Example 9 | 0.9 |
| Example 10 | 1.7 |
| Comparative Example 1 | 1.2 |
| Comparative Example 2 | 1.2 |

As shown in Tables 2 to 5, it was confirmed that the moisture control module for automobile lamps manufactured according to the present disclosure exhibited excellent moisture absorption rate and low release resistance and had low expansion properties, and did not damage the accommodating part and the cover. In particular, Examples 5 and 6, in which white clay and aluminum hydroxide were added to the composition, showed the most excellent moisture absorption rate, low release resistance, and expandability.

In contrast, in Examples 7 and 8, in which the amount of aluminum hydroxide added was too high, the cover and the accommodating part were damaged due to rapid expansion after moisture absorption of the composition, and a high release rate was recorded with a low moisture absorption rate. It is confirmed that the release property of the composition can be maintained only when starch or carboxymethyl cellulose capable of fixing moisture absorbed components in addition to white clay and aluminum hydroxide, which are porous moisture absorbing agent agents, are included.

In addition, Comparative Examples 1 and 2, which used polyethylene wax as a thickening agent, showed poor hygroscopicity and release properties, and the expansion height was not high compared to other examples, but due to high deliquescent properties, most of the absorbed components leaked into the deliquescent solution, and the expansion height seems to be relatively reduced.

Although a preferred embodiment of the present disclosure has been described above, the scope of the present disclosure is not limited to the specific embodiment, and a person skilled in the art may be appropriately changed within the scope described within the claims of the present disclosure.

What is claimed is:

1. A moisture control module for automobile lamps, the moisture control module comprising:
   an accommodating part having an inner space having an open upper surface;
   a cover including:
      an open area fastened to an upper part of the accommodating part and opened for ventilation to an outside; and
      a closed area closed to prevent damage to the cover due to expansion, and comprising a breathable film fused to an inside of the cover; and
   a moisture absorption composition accommodated in the inner space of the accommodating part,
   wherein the cover includes a protuberance extending along one end of the cover, the protuberance having an outer circumferential surface, the protuberance being inserted into the accommodating part,
   wherein the accommodating part includes a protrusion protruding toward the cover, the protrusion having an inner circumferential surface in direct contact with the outer circumferential surface of the protuberance, and
   wherein the outer circumferential surface of the protuberance and the inner circumferential surface of the protrusion are bonded together to secure the cover to the accommodating part.

2. The moisture control module of claim 1, wherein the breathable film is made of a nonwoven fabric formed of any one or a plurality of synthetic fibers selected from polyethylene, polypropylene, polybutylene, polyethylene terephthalate, polybutylene terephthalate, and polytrimethylene terephthalate.

3. The moisture control module of claim 2, wherein the breathable film further comprises any one or more layers made of one or more materials selected from polyolefin, polyester, polyamide, and polyacryl and laminated on one or both surfaces of the nonwoven fabric.

4. The moisture control module of claim 1, wherein the breathable film has a moisture permeability in a range of 400 to 6,000 g/m²·24 hr.

5. The moisture control module of claim 1, wherein the accommodating part further comprises a partition wall therein.

6. The moisture control module of claim 1, wherein the moisture absorption composition comprises at least one selected from a metal chloride, a metal oxide, a thickening agent, and a filler.

7. The moisture control module of claim 6, wherein the filler comprises perlite, white clay, and aluminum hydroxide.

8. The moisture control module of claim 6, wherein the metal chloride is magnesium chloride, calcium chloride, or a mixture thereof.

9. The moisture control module of claim 1, wherein the breathable film has a moisture permeability in a range of 500 to 5,000 g/m²·24 hr.

10. The moisture control module of claim 1, wherein the breathable film has a moisture permeability in a range of 600 to 4,000 g/m²·24 hr.

11. The moisture control module of claim 5, wherein the partition wall includes pores penetrating in a direction toward an accommodating space of the accommodating part.

12. The moisture control module of claim 11, wherein a diameter of the pores is smaller than a diameter of the moisture absorption composition.

13. The moisture control module of claim 1, wherein the protuberance comprises:
   a first protuberance part; and
   a second protuberance part spaced radially outwardly of the first protuberance part, and
   wherein the protrusion of the accommodating part is located between the first protuberance part and the second protuberance part.

14. The moisture control module of claim 13, wherein the protrusion of the accommodating part contacts the first protuberance part and the second protuberance part.

* * * * *